United States Patent [19]

Aune

[11] Patent Number: 5,196,047
[45] Date of Patent: Mar. 23, 1993

[54] METHOD OF TREATMENT OF ZINC-CONTAINING BY-PRODUCTS AND WASTE MATERIALS

[75] Inventor: Jan A. Aune, Enebakk, Norway

[73] Assignee: Elkem Technology a/s, Norway

[21] Appl. No.: 791,961

[22] Filed: Nov. 13, 1991

[30] Foreign Application Priority Data

Dec. 6, 1990 [NO] Norway .................. 905291

[51] Int. Cl.$^5$ ............................................. C22B 4/00
[52] U.S. Cl. ................................................ 75/10.3
[58] Field of Search ....................................... 75/10.3

[56] References Cited

U.S. PATENT DOCUMENTS

| 4,135,912 | 1/1979 | Matthew et al. | 75/10.53 |
| 4,571,261 | 2/1986 | Buren et al. | 75/696 |
| 4,606,760 | 8/1986 | Fritz | 75/10.3 |
| 4,957,551 | 9/1990 | Aune | 75/10.3 |
| 5,004,496 | 4/1991 | Aune | 75/10.3 |

FOREIGN PATENT DOCUMENTS 0153914 9/1985 European Pat. Off.
0285458 10/1988 European Pat. Off.
WO8100262 2/1981 PCT Int'l Appl.

OTHER PUBLICATIONS

Ushakov et al., "Processing of Slags of Heavy Non-ferrous Metals", Tsvetn. Met., Mar. 1984 (3), pp. 27-30 Abstract Only.

Primary Examiner—Peter D. Rosenberg
Attorney, Agent, or Firm—Lucas & Just

[57] ABSTRACT

The present invention relates to a method for treatment of zinc-containing by-products and waste materials from primary and secondary production of nonferrous metals and especially zinc- and leadcontaining slags from the production of lead. The by-products and the waste materials are supplied to a gastight closed electric smelting furnace in which the materials are melted and subjected to a selective metallothermic reduction in order to reduce and volatilize zinc and other volatile metals. Elemental sulphur and/or sulphur compounds are added to the smelting furnace in an amount sufficient to form a sulphide phase containing one or more of the elements Cu, Ni, Pb, As, Bi, Sb and Ag. An inert slag phase and the sulphide phase are tapped from the furnace, and zinc and other volatile metals are recovered from the off-gas from the furnace by condensation.

14 Claims, 1 Drawing Sheet

METHOD OF TREATMENT OF ZINC-CONTAINING BY-PRODUCTS AND WASTE MATERIALS

The present invention relates to a method for treatment of zinc-containing by-products and waste materials from production of non-ferrous metals.

By primary and secondary production of non-ferrous metals a number of by-products and waste materials are produced in different steps in the production. These by-products and waste materials are normally chemically complex materials and are often in such a state that it is technically and economically difficult to recover the valuable metals from the materials. These materials usually contain heavy metals like Cu, Pb, Ni, Sb, Bi, As and others in such a form that by deposition of the materials in landfills the heavy metals will during time be leached and thereby cause serious environmental pollution. The above mentioned by-products and waste materials are produced both by pyrometallurgical and hydrometallurgical processes for production of nonferrous metals.

In addition to heavy metals the above mentioned materials often contain appreciable amounts of zinc, as zinc normally is present in ores which are used for production of nonferrous metals like copper, nickel, lead and others.

The above mentioned by-products are normally mainly oxidic, but often contain some sulphur.

Examples of such by-products and waste materials that contain zinc are slags from production of basic lead from sulphide ores and residues which are produced in hydrometallurgical production of zinc, such as jarosite and ghoethite.

The above mentioned by-products and waste materials will in the future, due to the risk of environmental pollution, not be allowed to be deposited in landfills. Further, any waste materials containing more than 2 percent by weight of lead will not be allowed to be deposited in landfills regardless of the nature of the waste materials. This absolute limited lead content in waste material has already been implemented in California.

It is an object of the present invention to provide a method for treatment of zinc-containing by-products and waste materials from primary and secondary production of non-ferrous metals, especially zinc- and lead-containing slags formed during production of lead, whereby the mentioned materials are transferred into such a form that they can be deposited without any risk of environmental pollution and whereby zinc and other valuable components in the materials can be recovered in an economically viable way.

The present invention thus relates to a method for treatment of zinc-containing by-products and waste materials from primary and secondary production of non-ferrous metals, especially zinc- and lead-containing slags from the production of lead, said method being characterized in that the by-products and the waste materials are supplied to a gas-tight closed electric smelting furnace in which the materials are melted and subjected to a selective metallothermic reduction in order to reduce and volatilize zinc and other volatile metals and where elemental sulphur and/or sulphur compounds are added to the smelting furnace in an amount sufficient to form a sulphide phase containing one or more of the elements Cu, Ni, Pb, As, Bi, Sb and Ag, that an inert slag phase and the sulphide phase are tapped from the furnace, and that zinc and other volatile metals are recovered from the off-gas from the furnace by condensation.

If the materials which are to be treated are water-containing residues, they are preferably subjected to drying at a low temperature before they are supplied to the smelting furnace. If the residue consist of very fine particles, they are preferably agglomerated before they are supplied to the smelting furnace.

Materials from pyrometallurgical processes, such as for example slags, can be supplied to the smelting furnace in liquid form or in the form of granules.

As reduction material for the metallothermic reduction it is preferred to add ferrosilicon having a silicon content between 40 and 75% by weight. It is especially preferred to add ferrosilicon having a silicon content of 60 to 70% by weight. The density of this alloy is such that the reduction material will slowly fall down through the slag phase in the smelting furnace, which gives a long retention time for the reduction material in the slag phase. Hence a good utilization of the reduction material is achieved. It is, however, within the scope of the present invention to supply iron, silicon, aluminium, or magnesium or alloys of these metals as metallothermic reduction material for selective reduction of zinc and other volatile metals.

The metallothermic reduction material preferably has a particle size below 25 mm. In order to ensure a good contact between the particles of the metallothermic reduction material and the materials which are to be reduced, it is especially preferred to supply a metallothermic reduction material having a particle size below 3 mm and in particular below 1 mm.

The metallothermic reduction material is preferably supplied to the smelting furnace by injection into the slag phase, but it can also be mixed with the by-products and the waste materials before these are being supplied to the smelting furnace.

In order to produce the sulphide phase, pyrite $FeS_2$ is preferably added to the furnace. The amount of sulphur added is calculated in order to transfer all the heavy metals contained in the supplied by-products and waste materials into the sulphide phase. As the by-products and the waste materials often contain some sulphur, this has to be taken into consideration in calculating the necessary amount of sulphur added to the smelting furnace.

In order to obtain an inert slag which also has a sufficient low viscosity at the temperature in the smelting furnace, it is aimed to produce a slag phase having a basicity of about 1, calculated as the ratio between $CaO+MgO$ and $SiO_2+Al_2O_3$. The basicity of the slag is if necessary adjusted by adding slagforming materials such as $SiO_2$-sand or a CaO-containing material to the smelting furnace.

By using ferrosilicon as the metallothermic reduction material, silicon is supplied to the smelting furnace. This silicon is during the reduction oxidized to $SiO_2$. Ferrosilicon will thereby both act as a metallothermic reduction material and as a slag forming material. The metallic iron contained in the ferrosilicon will also act as a reduction material and thereby be oxidized to FeO, which will enter into the slag phase.

The temperature in the smelting furnace is kept between 1200° and 1700° C., and preferably between 1250° and 1400° C. By these temperatures a good reduction of zinc and other volatile metals, a low viscous slag and a molten sulphide phase are achieved. In the method of the present invention an off-gas is produced which is very rich in zinc vapor and other volatile elements, due to the fact that the metallothermic reduction does not produce any other gases. The only gas other than metal vapors which are produced in the smelting furnace is a small amount of CO derived from the carbon electrodes in the smelting furnace. The off-gas from the smelting furnace will thus not contain $CO_2$ or other oxidizing gases. The yield of zinc and other volatile metals by condensation in condensers outside the smelting furnaces will thereby be high and the amount of reoxidized metal vapor will be low.

The sulphide phase which is tapped from the smelting furnace can either be processed in order to recover valuable elements like copper or nickel and/or noble metals like silver and gold, or it can be sold as a matte to copper- and nickel refineries. It should be mentioned that some of the by-products and waste materials which are treated according to the method of the present invention may contain appreciable amounts of noble metals. If this is the case, recovery of noble metals form the sulphide phase alone may make the method economically viable.

The slag which is tapped from the smelting furnace has a very low content of heavy metals, and will, if the basicity of the slag is correctly adjusted, be inert. The slag is therefore allowed to be deposited in landfills without any specific precautions.

BRIEF DESCRIPTION OF THE DRAWINGS

The present invention will now be further described in connection with FIG. 1, which shows a flow diagram illustrating the method of the present invention.

According to the embodiment shown in FIG. 1 reference numeral 1 shows a gas-tight covered electrothermic smelting furnace. The smelting furnace 1 can be of any conventional type, but it is preferred to utilize an electrothermic smelting furnace with circular cross-section equipped with three carbon electrodes 2. (Only one electrode 2 is shown in FIG. 1). The by-products or waste materials are supplied to the smelting furnace 1 in a gas-tight way from a silo 3 through a charging chute 4. In the smelting furnace 1 the supplied materials are heated and smelted at a temperature between 1200° and 1700° C., preferably between 1250° and 1400° C. A metallothermic reduction material, preferably ferrosilicon, in an amount sufficient for reduction of the zinc content in the supplied by-products and waste materials, is injected into the slag phase 5 by means of an injector 6. Alternatively the metallothermic reduction material is added together with the by-products or the waste materials. The added metallothermic reduction material will selectively reduce zinc oxides and oxides or sulphides of other easily reducible elements such as lead and cadmium. Iron oxides will not be reduced, but will remain in the slag phase. Elemental sulphur or a sulphur compound such as $FeS_2$, is added together with the by-products or the waste materials in order to convert the heavy metals and noble metals in the by-products and the waste materials into a sulphide phase. This sulphide phase has a higher density than the slag phase and will thus be accumulated as a sulphide or matte phase below the slag phase 5 as indicated by reference numeral 7. The amount of sulphur added to the smelting furnace is sufficient to form a sulphide phase of the heavy metals and the noble metals present.

Figure 1:
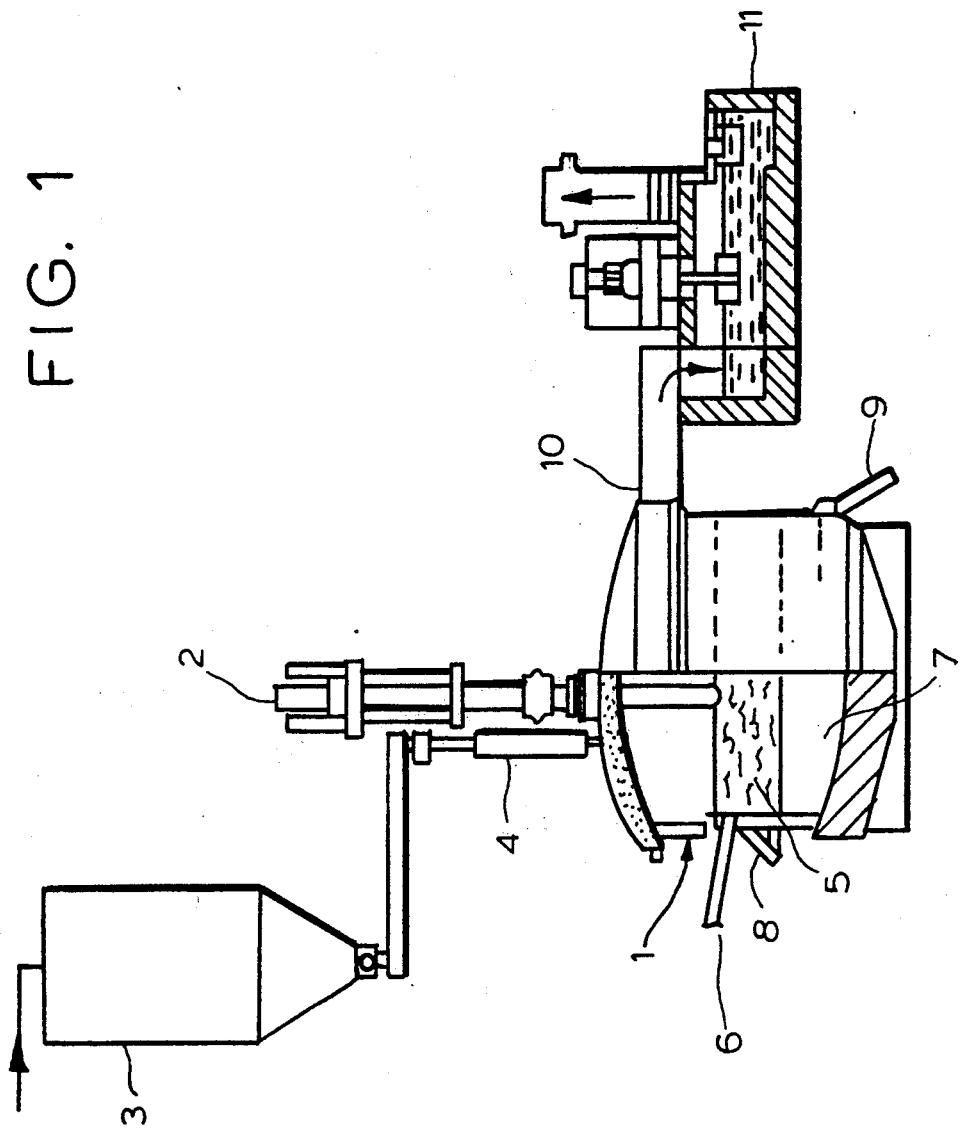

In order to ensure a slag phase which has a sufficiently low viscosity at the temperature in the smelting furnace, and which is inert after tapping and cooling, if necessary, slag formers such as $SiO_2$-sand or calcium oxide are added to to the smelting furnace. The slag phase 5 is tapped from the smelting furnace 1 through a first tapping hole 8 and the sulphide phase is tapped through a second tapping hole 9 arranged at a lower level than the tapping hole 8.

The off-gas from the smelting furnace, which substantially consists of zinc vapor and vapor of other volatile metals, is transported from the smelting furnace through an off-gas channel 10 to a condenser 11 which can be of any known type. In the condenser the zinc vapor is condensed to liquid or solid zinc and the other metal vapors are condensed to liquid or solid metals.

The amount of gas leaving the condenser will be very small and consists mainly of CO. This gas can be forwarded to an afterburner and thereafter treated to remove dust contained in the gas.

EXAMPLE 1

A slag from production of basic lead from sulphide ore was added to a smelting furnace as described above in connection with FIG. 1. The chemical composition of the slag is shown in table 1.

TABLE 1

| Chemical composition (% by weight) of slag from basic lead production. | |
|---|---|
| Pb (total) | 2–4% (average 2.5%) |
| S | 1–3% (In the form of iron sulphide, lead sulphide and copper sulphide) |
| Cu | 0.1–0.4% |
| $SiO_2$ | 18–25% |
| FeO | 28–35% |
| CaO | 9–14% |
| MgO | 4–7% |
| Zn (total) | 10–14% (average 11%) |
| As | 0.05% |
| Sb | 0.03% |
| Ni | 0.05% |
| Ag | 3–7 grams per ton |

The slag was supplied in liquid form to the smelting furnace through a gas tight slag duct. 65% FeSi with a particle size of less than 1 mm was injected in the slag phase for selective reduction of the zinc and lead contained in the slag. As the sulphur content of the supplied slag from production of basic lead was sufficient to form sulphides of the heavy metals in the slag, it was not necessary to add extra sulphur to the smelting furnace.

From the smelting furnace an inert slag was topped containing 0.2% lead and 1.8% zinc. This shows that the reduction of zinc and lead has been very good. The produced slag satisfies the conditions which a material has to meet in order to be deposited in ordinary landfill. From the smelting furnace a sulphide phase was further topped containing the main amounts of Pb, Cu, As, Sb, Ni and Ag.

The off-gas from the smelting furnace contained mainly zinc vapor and some lead vapor. The zinc vapor was condensed with a high yield of metallic zinc.

EXAMPLE 2

By sulphuric acid leaching of roasted zinc sulphide ore, residue is formed which contains about 18–22% Zn, mainly in the form of zinc ferrite. This residue further contains 30–40% of the copper content of the roasted ore, 10–30% of the cadmium content of the ore and practically all lead and silver present in the roasted zinc sulphide ore.

Tests have shown that these kind of residues can be treated by the method of the present invention. Before the residue is supplied to the smelting furnace, the residue is dried at a low temperature in order to remove water. Thereafter the dryed residue is agglomerated and added to the smelting furnace together with ferrosilicon and pyrite. The produced slag contains less than 1% lead and less than 2% zinc. Zinc and cadmium are recovered from the off-gas at a high yield. Most of the lead content together with all copper and other heavy metals and noble metals are found in the sulphide phase.

EXAMPLE 3

In a number of zinc plants based on sulphuric acid leaching of roasted zinc sulphide ore, the residues described in example 2 are further treated with a strong sulphuric acid solution in order to dissolve the zinc ferrites. In order to remove the dissolved iron from this leach solution, the solution is neutralized by addition of zinc oxide. By adding of $K^+$, $Na^+$ and $NH_4^+$ ions to the neutralized solution iron is precipitated in the form of jarosite or paraghoetithe together with heavy metals and some noble metals. Due to the neutralizing with zinc oxide, the jarosite and paraghoetithe residues will contain 6-8% zinc and some heavy metals and noble metals. Such residues are in Norway only allowed to be deposited in mountain halls and represent a major environmental and economical problem.

A paraghoetite residue having a chemical composition as shown in table 2, was treated by the method of the present invention.

TABLE 2

| Chemical composition of paraghoetite (% by weight) | |
|---|---|
| Zn | 6.5% |
| Fe | 43.5% |
| Pb | 2.4% |
| Cu | 0.17% |
| S | 5.77% |
| CaO | 7.2% |
| $SiO_2$ | 1.2% |
| $Al_2O_3$ | 1.28% |
| MgO | 0.140% |
| As | 0.770% |
| Sb | 0.08% |
| Cd | 0.16% |
| Ag | 0.006% |
| Reminder | water |

The paraghoetite residue was dried at low temperature in order to remove water, and thereafter agglomerated. The agglomerates were supplied to the smelting furnace as shown in FIG. 1. Ferrosilicon was added as a reduction material for selective reduction of zinc, cadmium and lead. $SiO_2$-sand was added as a slag former in order to produce a slag having basicity of about 1.

From the smelting furnace it was tapped an inert slag containing the main part of the iron in the material supplied to the furnace. The slag contained less than 0.5% lead and about 1% zinc. The sulphide phase which was tapped from the smelting furnace contained the most of the lead content, the heavy metals and the silver contained in the materials supplied to the smelting furnace. Zinc, cadmium and a part of the lead were recovered from the off-gas by condensation.

As is evident from the examples, zinc-containing by-products and waste materials from the production of non-ferrous metals can effectively be treated by the method according to the present invention. By this treatment the materials will not any longer represent an environmental problem. The very high recovery of zinc which is obtained by the method, will in most cases give an economically viable process.

I claim:

1. A method for treating a waste material which contains zinc and heavy metals to form an inert slag and to separate the zinc from the heavy metals and recover the zinc and heavy metals, said method comprising:
   supplying to a gas-tight electric smelting furnace a waste material and a sulfur-containing compound, said waste material obtained from a process used to produce a non-ferrous metal, said waste material containing oxidized zinc and one or more heavy metals selected from the group consisting of copper, nickel, lead, arsenic, bismuth, antimony and silver;
   adding a metallic reduction material to the furnace to reduce said oxidized zinc to zinc;
   maintaining the furnace at a temperature of about 1200° C. to about 1700° C. to form a gas phase of zinc, a slag phase, and a molten sulfide phase, said molten sulfide phase containing said heavy metals, thereby separating the zinc from said heavy metals;
   a first tapping step to remove the sulfide phase and thereby recover the heavy metals from the waste material in the form of a sulfur compound;
   a second tapping step to remove the slag phase as an inert slag suitable for deposit in a landfill; and
   condensing the gas phase and recovering the zinc.

2. The method of claim 1 further comprising the step of drying said waste material prior to supplying said waste material to the furnace.

3. The method of claim 1 wherein said waste material is supplied to the furnace in a liquid form.

4. The method of claim 1 wherein said reduction material is selected from the group consisting of iron, aluminum, silicon, magnesium and alloys thereof.

5. The method of claim 4 wherein said reduction material is ferrosilicon containing between about 40% and about 75% by weight silicon.

6. The method of claim 5 wherein said ferrosilicon contains about 60% to about 70% by weight silicon.

7. The method of claims 1, 4, 5 or 6 wherein the reduction material has a particle size of less than 25 mm.

8. The method of claims 1, 4, 5 or 6 wherein the reduction material has a particle size of less than 3 mm.

9. The method of claim 1 wherein said sulfur-containing compound is pyrite.

10. The method of claim 1 further comprising the step of adding slag forming materials to the furnace to adjust the slag phase to have a basicity of about 1, wherein basicity is defined as the ratio of CaO and MgO to $SiO_2$ and $Al_2O_3$.

11. The method of claim 10 wherein the slag forming material is selected from the group consisting of $SiO_2$-sand and CaO-containing material.

12. The method of claim 1 wherein the step of adding the reduction material to the furnace is accomplished by injecting the reduction material into the slag phase.

13. The method of claim 1 wherein the step of adding the reducing material to the furnace is accomplished by mixing said reducing material with waste material such that said waste material being added to the furnace when said waste material and said sulfur-containing compound are supplied to the furnace.

14. The method of claim 1 wherein said sulfur-containing compound is said waste material.

* * * * *